United States Patent
Kim et al.

(10) Patent No.: US 12,347,028 B2
(45) Date of Patent: Jul. 1, 2025

(54) SYSTEM AND METHOD FOR GENERATING HIGH RESOLUTION 3D MODEL

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Dong Ho Kim, Seoul (KR); Jung Seok Park, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 171 days.

(21) Appl. No.: 18/161,038

(22) Filed: Jan. 28, 2023

(65) Prior Publication Data
US 2024/0221299 A1 Jul. 4, 2024

(30) Foreign Application Priority Data

Dec. 28, 2022 (KR) .......................... 10-2022-0186618
Jan. 20, 2023 (KR) .......................... 10-2023-0008937

(51) Int. Cl.
*G06T 17/00* (2006.01)
*G06T 7/50* (2017.01)
(Continued)

(52) U.S. Cl.
CPC ................ *G06T 17/00* (2013.01); *G06T 7/50* (2017.01); *G06T 7/70* (2017.01); *G06T 11/003* (2013.01)

(58) Field of Classification Search
CPC ......... G06T 17/20; G06T 19/00; G06T 17/00; G06T 17/10; G06T 7/50; G06T 7/70;
(Continued)

(56) References Cited

U.S. PATENT DOCUMENTS

| 2007/0052708 | A1* | 3/2007 | Won | ........................ G06T 15/20 345/427 |
| 2015/0109415 | A1* | 4/2015 | Son | ........................ H04N 7/18 348/46 |

(Continued)

FOREIGN PATENT DOCUMENTS

KR 10-1608253 B1 4/2016

*Primary Examiner* — Gordon G Liu
(74) *Attorney, Agent, or Firm* — You & IP, LLC

(57) ABSTRACT

Provided are a system and a method for generating a high-resolution 3D model. According to an embodiment, a high-resolution 3D image is generated by correcting the following losses: symmetry loss that includes image symmetry loss and vertex symmetry loss between a 3D refined image and a symmetry image symmetrical to the 3D refined image with symmetry reliability degrees of a training device; displacement loss between vertexes of the 3D model image and vertexes of the 3D refined image refined on the basis of vertex coordinate information of the training device; silhouette loss through silhouette comparison between the original image and the 3D model image resulting from conversion into a derived view point of a spherical coordinate system; and edge loss and line loss between the original image and the 3D refined image.

10 Claims, 5 Drawing Sheets

(51) Int. Cl.
*G06T 7/70* (2017.01)
*G06T 11/00* (2006.01)

(58) Field of Classification Search
CPC ....... G06T 11/003; G06T 17/005; G06T 7/62; G06T 2207/30196; G06T 19/20; G06T 7/10; G06T 7/40; G06T 15/04; G06T 19/006; G06T 2200/24; G06T 2219/2012; G06T 2219/2021; G06V 10/761
USPC ......................................................... 345/420
See application file for complete search history.

(56) References Cited

U.S. PATENT DOCUMENTS

| | | | |
|---|---|---|---|
| 2019/0057509 A1* | 2/2019 | Lv ............................. | G06T 7/11 |
| 2022/0068007 A1* | 3/2022 | Lafer ........................ | G06T 7/50 |
| 2023/0230275 A1* | 7/2023 | Lin ........................... | G06T 7/70 |
| | | | 382/103 |

* cited by examiner

From left, original, Edge, Line Detection results

SYSTEM AND METHOD FOR GENERATING HIGH RESOLUTION 3D MODEL

BACKGROUND OF THE INVENTION

Field of the Invention

The present disclosure relates to a system and a method for generating a high-resolution 3D model. More particularly, the present disclosure relates to a technology for generating a high-resolution 3D image through training of a neural network by using a reconstructed 3D model, a 3D estimated image derived through a training result based on the neural network, a 3D refined image for the 3D estimated image, and estimated view point information.

Description of the Related Art

A 3D reconstruction technology for reconstructing objects photographed in AR, VR, etc. into 3D models is implemented by training a deep learning neural network.

For training, a photographed object and a 3D model of the object are required. Difficult tasks, such as high-resolution laser scanning, are required in order to obtain the 3D model of the object.

Therefore, because types of objects available for training are limited, a 3D model that a 3D modeling neural network generates with reference to a photograph tends to ignore details of the object in the photograph.

For example, similar chairs may have different shapes of backs, legs, and the like, but all of these are ignored and the same 3D model is created.

To overcome this, a general 3D algorithm compares a photograph and a generated 3D model and modifies the 3D model to be closer to the photograph.

However, loss used to train a refinement neural network during reconstruction of a generated 3D model uses only an outline of an object in a photograph, so the resulting 3D model does not reflect a detailed structure well, and does not operate normally when the number of points constituting the 3D model increases.

Thus, the applicant intends to propose a method capable of determining a detailed structure of an object included in an input image, reducing a difference between the input image and a 3D estimated image, and simultaneously operating on a 3D model having no view point information or having many points constituting the 3D model.

The above-described information in BACKGROUND is technical information possessed to derive the disclosure or acquired by the inventor while deriving the disclosure, and cannot thus be said to be technical information known to the public before filing the disclosure.

DOCUMENT OF RELATED ART (Patent Document 1) Korean Patent No. 10-1608253 (28 Mar. 2016)

SUMMARY OF THE INVENTION

The present disclosure is directed to generate a high-resolution 3D image by using a reconstructed 3D model image, a 3D estimated image derived through a training result based on a neural network, a 3D refined image for the 3D estimated image, and estimated view point information.

In addition, the present disclosure can improve the versatility of a system for generating a high-resolution 3D model as a high-resolution 3D image is generated by a lightweight device.

The objectives of the present disclosure are not limited thereto, and the other objectives and advantages of the present disclosure which are not described will be understood from the following description and become apparent by the embodiments of the present disclosure. In addition, it is understood that the objectives and advantages of the present disclosure may be implemented by components defined in the appended claims or their combinations.

According to an aspect of the present disclosure, there is provided a system for generating a high-resolution 3D model, the system including:

- an image reconstruction device for performing reconstruction on one original image to generate a 3D model image;
- a training device for performing training based on a neural network by using the original image and the 3D model image as inputs, to derive symmetry reliability degrees, vertex coordinate information, and movement control coefficients;
- a refinement device for refining the 3D model image on the basis of the vertex coordinate information to derive a 3D refined image;
- a view point generation device for generating a view point that is location coordinates of a camera, by using the original image as an input; and
- a postprocessing device for deriving at least one loss function on the basis of the original image, the view point, the 3D model image, and the 3D refined image, and generating an optimal parameter for minimizing the derived loss function, and training the neural network of the training device with the generated optimal parameter.

Preferably, the step of view point generating includes:
- a view point estimator for performing training based on the neural network with respect to the original image, and estimating the view point that is a photographing location of the original image with a plurality of cameras;
- a view point deriver for performing training based on the neural network with respect to the estimated view point, and then deriving loss between a location of the camera and the estimated view point by using binary cross-entropy (BCE) for a training result, and deriving an optimal view point for minimizing the derived loss; and
- a view point converter for converting the optimal view point of an orthogonal coordinate system into a spherical coordinate system.

Preferably, the postprocessing device includes at least one of the following:
- a symmetry loss generator for generating image symmetry loss and vertex symmetry loss between the 3D refined image and a symmetry image symmetrical to the 3D refined image with the symmetry reliability degrees of the training device;
- a displacement loss generator for generating displacement loss between vertexes of the 3D refined image and vertexes of the 3D model image on the basis of vertex coordinates to be moved and derived by the training device, the movement control coefficients of the remaining vertexes excluding the vertexes to be moved, and the vertex coordinate information of the training device;

a silhouette loss generator for generating silhouette loss through silhouette comparison between the original image and the 3D model image resulting from conversion to the generated view point of a spherical coordinate system; and a boundary loss generator for generating edge loss and line loss between the original image and the 3D refined image.

Preferably, the vertex symmetry loss function is defined as vertex loss between the 3D refined image and the symmetry image symmetrical to the 3D refined image with respect to a central axis determined on the basis of the symmetry reliability degrees $V_{sConf}$ of the training device, and the defined vertex symmetry loss function satisfies Equation 1.

[Equation 1]
$$\text{Vertex symmetry loss} = \frac{1}{N}\sum_{i=1}^{N}\sigma_i \min \|Tv_i - v_j\|_2^2 + \lambda_{SymB}\ln\left(\frac{1}{\sigma_i}\right)$$

Herein, $\sigma_i \in V_{sConf}$, $v_i$ denote the vertexes of the 3D refined image, T denotes a symmetry operator, and $\lambda_{SymB}$ denotes a hyperparameter determined as a training result.

Preferably, the image symmetry loss function is defined as an image pair $\{(M_r^{p1}, M_r^{T\,p1}), \ldots, (M_r^{pm}, M_r^{T\,pm})\}$ between the 3D model image rendered with a plurality of view points $P_{Isym}=\{p_1, \ldots, p_m\}$ and the original image, and the defined image symmetry loss function satisfies Equation 2.

[Equation 2]
$$\text{Image symmetry loss} = \frac{1}{m}\sum_{i=1}^{m}\sum_{j,k}\left[\sigma_{j,k}\left\|\gamma(h(M_r^{p1}))_{j,k} - \gamma(M_r^{Tp1})_{j,k}\right\|_2^2 + \lambda_{SymB}\ln\left(\frac{1}{\sigma_{j,k}}\right)\right]$$

h(•) denotes a vertical image flip, j,k denote image coordinates, $\sigma_{j,k}$ denote the symmetry reliability degrees in the image coordinates, and $\gamma$(•) denotes a silhouette.

Preferably, the displacement loss function is defined as a mean squared error (MSE) that is derived on the basis of the vertex coordinate information $\varepsilon_{offset}$ of the training device to be moved among the multiple vertexes, and the movement control coefficients $V_{Deform}$ of the remaining vertexes excluding the vertexes to be moved, and the defined displacement loss function satisfies Equations 3 and 4.

[Equation 3]
$$\text{Huber loss} = \begin{cases} \sum_{i=1}^{N} 0.5*(y_i - \hat{y}_i)^2 & \text{if } |y_i - \hat{y}_i| < \delta \\ \sum_{i=1}^{N} \delta*(|y_i - \hat{y}_i| - 0.5*\delta) \end{cases}$$

[Equation 4]
$$\text{Displacement loss} = \begin{cases} \text{Huber loss} - \sum_{j=1}^{M} 0.5*(y_j - \hat{y}_j)^2 & \text{if } |y_j - \hat{y}_j| < \delta \\ \text{Huber loss} - \sum_{j=1}^{M} \delta*(|y_j - \hat{y}_j| - 0.5*\delta) \end{cases}$$

Herein, N denotes the number of the vertexes, $y_i$ denote vertex coordinates of the 3D model image resulting from reconstruction, $\hat{y}_i$ denote vertex coordinates of a 3D refinement model, M denotes the number of the vertexes of the 3D model image to be moved, $y_j$ denote vertex coordinates of the 3D model image to be moved, and $\hat{y}_j$ denote moved vertex coordinates of the 3D refined image.

Preferably, the silhouette loss function is defined as a sum of a partial silhouette loss function and loss function binary cross-entropy (BCE) for silhouette for coordinates $y_i$ of the vertexes of the 3D model image resulting from conversion to the view point and coordinates $\hat{y}_i$ of vertexes of the original image, and the silhouette loss function satisfies Equation 5.

[Equation 5]
$$\text{silhouette loss} = -(y_i \log(p_i) + (1 - y_i)\log(1 - p_i)) + \log\frac{|S_{image} - S_{refine}|}{|S_{image} - S_{original}|}$$

Herein, $S_{image}$ denotes the original image, $S_{refin}$ denotes the 3D refined image, and $S_{original}$ denotes the 3D model image. $y_i$ denote binary indicators (0,1), and p denotes probability distribution.

According to another aspect of the present disclosure, there is provided a method for generating a high-resolution 3D model, the method including steps of:

performing reconstruction on one original image to generate a 3D model image; performing training based on a neural network by using the original image and the 3D model image as inputs, to derive symmetry reliability degrees, vertex coordinate information, and movement control coefficients; refining the 3D model image on the basis of the vertex coordinate information to derive a 3D refined image;

a view point generation device for generating a view point that is location coordinates of a camera, by using the original image as an input; and a postprocessing device for deriving at least one loss function on the basis of the original image, the view point, the 3D model image, and the 3D refined image, and generating an optimal parameter for minimizing the derived loss function, and training the neural network of the training device with the generated optimal parameter.

Preferably, the step of view point generating includes:
performing training based on the neural network with respect to the original image, and estimating the view point that is a photographing location of the original image with a plurality of cameras;

performing training based on the neural network with respect to the estimated view point, and then deriving loss between a location of the camera and the estimated view point by using binary cross-entropy (BCE) for a training result, and deriving an optimal view point for minimizing the derived loss; and converting the optimal view point of an orthogonal coordinate system into a spherical coordinate system.

Preferably, the loss function includes at least one of the following:

symmetry loss including image symmetry loss and vertex symmetry loss between the 3D refined image and a symmetry image symmetrical to the 3D refined image with the symmetry reliability degrees of the training device;

displacement loss between vertexes of the 3D model image and vertexes of the 3D refined image refined on the basis of the vertex coordinate information of the training device;

silhouette loss through silhouette comparison between the original image and the 3D model image resulting from conversion to the generated view point of a spherical coordinate system; and edge loss and line loss between the original image and the 3D refined image.

Preferably, the vertex symmetry loss function is defined as vertex loss between the 3D refined image and the symmetry image symmetrical to the 3D refined image with respect to a central axis determined on the basis of the symmetry reliability degrees $V_{sConf}$ of the training device, and the defined vertex symmetry loss function satisfies Equation 11.

[Equation 11]

Vertex symmetry loss =

$$\frac{1}{N}\sum_{i=1}^{N}\sigma_i \min \|Tv_i - v_j\|_2^2 + \lambda_{SymB}\ln\left(\frac{1}{\sigma_i}\right)$$

Herein, $\sigma_i \in V_{sConf}$, $v_i$ denote the vertexes of the 3D refined image, T denotes a symmetry operator, and $\lambda_{SymB}$ denotes a hyperparameter determined as a training result.

Preferably, the image symmetry loss function is defined as an image pair $\{(M_r^{p1}, M_r^{T\,p1}), \ldots, (M_r^{pm}, M_r^{T\,pm})\}$ between the 3D model image rendered with a plurality of view points $P_{Isym}=\{p_1, \ldots, p_m\}$ and the original image, and the defined image symmetry loss function satisfies Equation 12.

[Equation 12]

Image symmetry loss = $\frac{1}{m}$ $$\sum_{i=1}^{m}\sum_{j,k}\left[\sigma_{j,k}\left\|\gamma(h(M_r^{p1}))_{j,k} - \gamma(M_r^{Tp1})_{j,k}\right\|_2^2 + \lambda_{SymB}\ln\left(\frac{1}{\sigma_{j,k}}\right)\right]$$

h(•) denotes a vertical image flip, j,k denote image coordinates, $\sigma_{j,k}$ denote the symmetry reliability degrees in the image coordinates, and γ(•) denotes a silhouette.

Preferably, the displacement loss function is defined as a mean squared error (MSE) that is derived on the basis of vertex coordinates of the 3D refined image refined with the vertex coordinate information $\varepsilon_{offset}$ of the training device to be moved among the multiple vertexes and the movement control coefficients $V_{Deform}$ of the remaining vertexes excluding the vertexes to be moved, and the defined displacement loss function satisfies Equations 13 and 14.

[Equation 13]

$$\text{Huber loss} = \begin{cases} \sum_{i=1}^{N} 0.5 * (y_i - \hat{y}_i)^2 & \text{if } |y_i - \hat{y}_i| < \delta \\ \sum_{i=1}^{N} \delta * (|y_i - \hat{y}_i| - 0.5 * \delta) \end{cases}$$

[Equation 14]

Displacement loss =

$$\begin{cases} \text{Huber loss} - \sum_{j=1}^{M} 0.5 * (y_j - \hat{y}_j)^2 & \text{if } |y_j - \hat{y}_j| < \delta \\ \text{Huber loss} - \sum_{j=1}^{M} \delta * (|y_j - \hat{y}_j| - 0.5 * \delta) \end{cases}$$

Herein, N denotes the number of the vertexes, $y_i$ denote vertex coordinates of the 3D model image resulting from reconstruction, $\hat{y}_i$ denote vertex coordinates of a 3D refinement model, M denotes the number of the vertexes of the 3D model image to be moved, $y_j$ denote vertex coordinates of the 3D model image to be moved, and $\hat{y}_j$ denote moved vertex coordinates of the 3D refined image.

Preferably, the silhouette loss function is defined as a sum of a partial silhouette loss function and loss function binary cross-entropy (BCE) for silhouette for coordinates $y_i$ of the vertexes of the 3D model image resulting from conversion to the view point and coordinates $\hat{y}_i$ of vertexes of the original image, and the silhouette loss function satisfies Equation 15.

[Equation 15]

silhouette loss =

$$-(y_i \log(p_i) + (1 - y_i)\log(1 - p_i)) + \log\frac{|s_{image} - s_{refine}|}{|s_{image} - s_{original}|}$$

Herein, $S_{image}$ denotes the original image, $S_{refin}$ denotes the 3D refined image, and $S_{original}$ denotes the 3D model image. $y_i$ denote binary indicators (0,1), and p denotes probability distribution.

According to these features, a high-resolution 3D image can be generated by correcting the following losses: symmetry loss that includes image symmetry loss and vertex symmetry loss between a 3D refined image and a symmetry image symmetrical to the 3D refined image with symmetry reliability degrees of a training device; displacement loss between vertexes of the 3D model image and vertexes of the 3D refined image refined on the basis of vertex coordinate information of the training device; silhouette loss through silhouette comparison between the original image and the 3D model image resulting from conversion into a derived view point of a spherical coordinate system; and edge loss and line loss between the original image and the 3D refined image.

In addition, the present disclosure can improve the versatility of a system for generating a high-resolution 3D model as a high-resolution 3D image is generated by a lightweight device.

BRIEF DESCRIPTION OF THE DRAWINGS

The accompanying drawings illustrate preferred embodiments of the present disclosure and together with the following disclosure, serve to provide further understanding of the technical features of the present disclosure, and thus, the present disclosure is not to be construed as being limited to the drawing, in which.

DETAILED DESCRIPTION OF THE INVENTION

Figure 1:
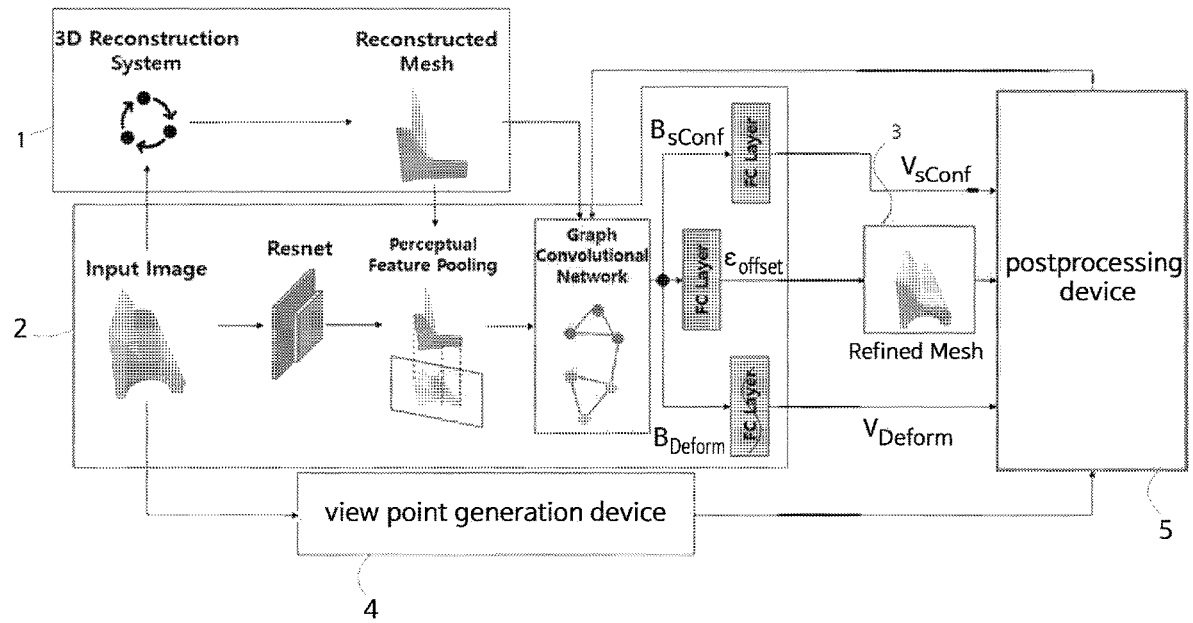
FIG. 1 is a diagram illustrating a configuration of a system for generating a high-resolution 3D model according to an embodiment.

Hereinbelow, the embodiments of the present disclosure will be described in detail with reference to the accompanying drawings such that the present disclosure can be easily embodied by those skilled in the art to which this present disclosure belongs. However, the present disclosure may be embodied in various different forms and should not be limited to the embodiments set forth herein. Further, in order to clearly explain the present disclosure, portions that are not related to the present disclosure are omitted in the drawings, and like reference numerals designate like elements throughout the specification.

In the following embodiments, a configuration for generating a high-resolution 3D image will be described, wherein the high-resolution 3D image is generated by correcting the following losses: symmetry loss that includes image symmetry loss and vertex symmetry loss between a 3D refined image and a symmetry image symmetrical to the 3D refined image with symmetry reliability degrees of a training device; displacement loss between vertexes of the 3D model image and vertexes of the 3D refined image refined on the basis of vertex coordinate information of the training device; silhouette loss through silhouette comparison between the original image and the 3D model image resulting from conversion into a derived view point of a spherical coordinate system; and edge loss and line loss between the original image and the 3D refined image.

Figure 2:
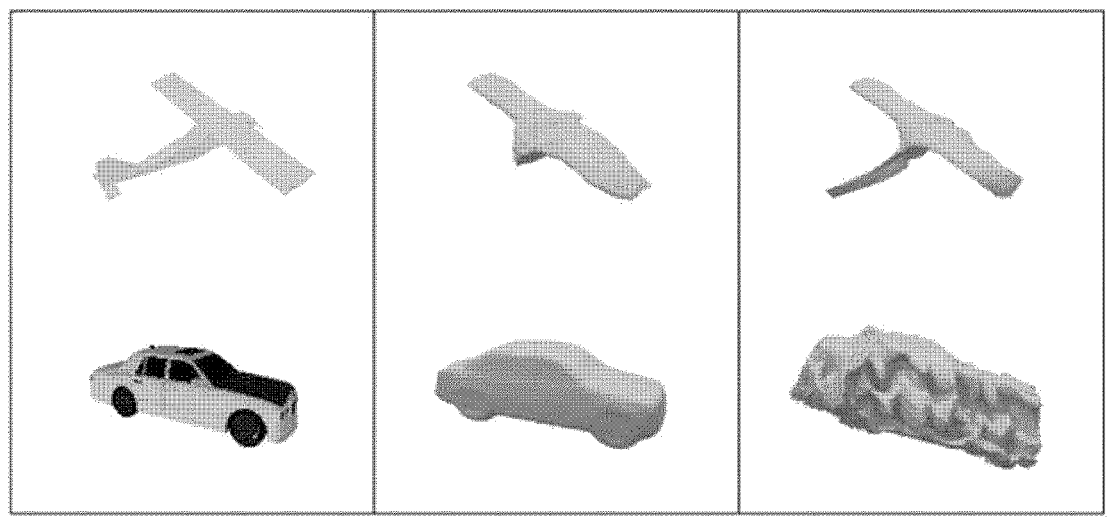
FIG. 2 is a diagram illustrating examples of output images of each device of FIG. 1.
Figure 3:
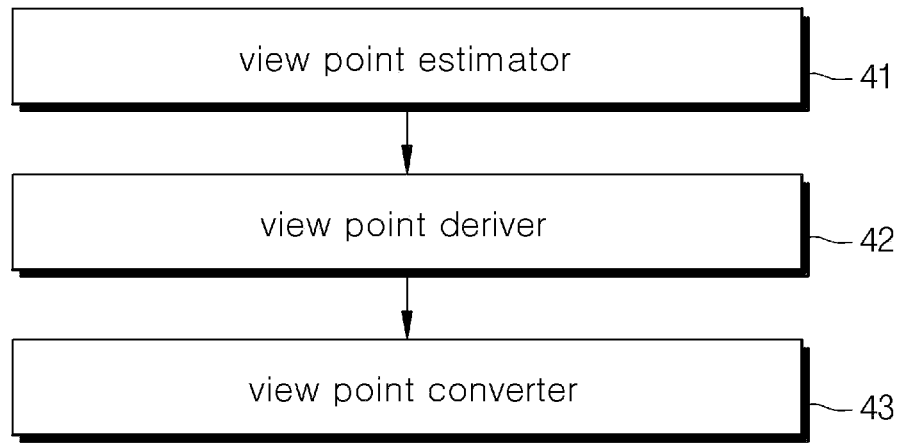
FIG. 3 is a diagram illustrating a detailed configuration of a view point generation device of FIG. 1.
Figure 4:
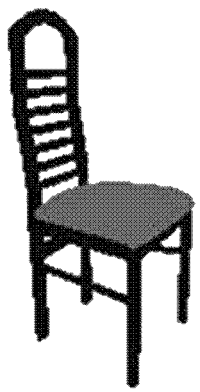
FIG. 4 is a diagram illustrating an output image of a view point generation device of FIG. 3.
Figure 4:
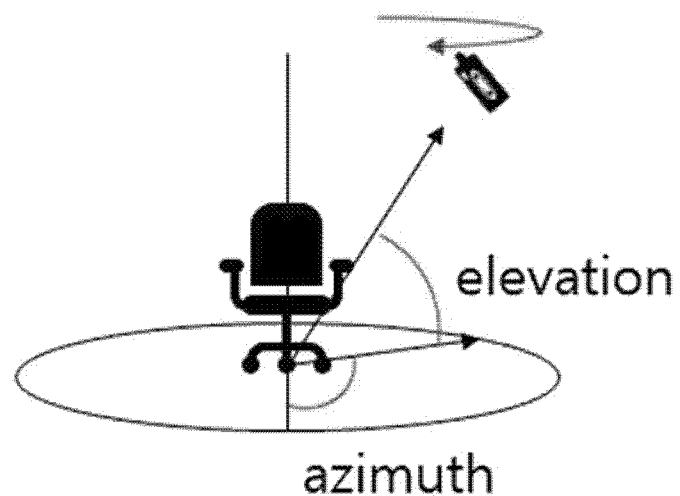
Figure 5:
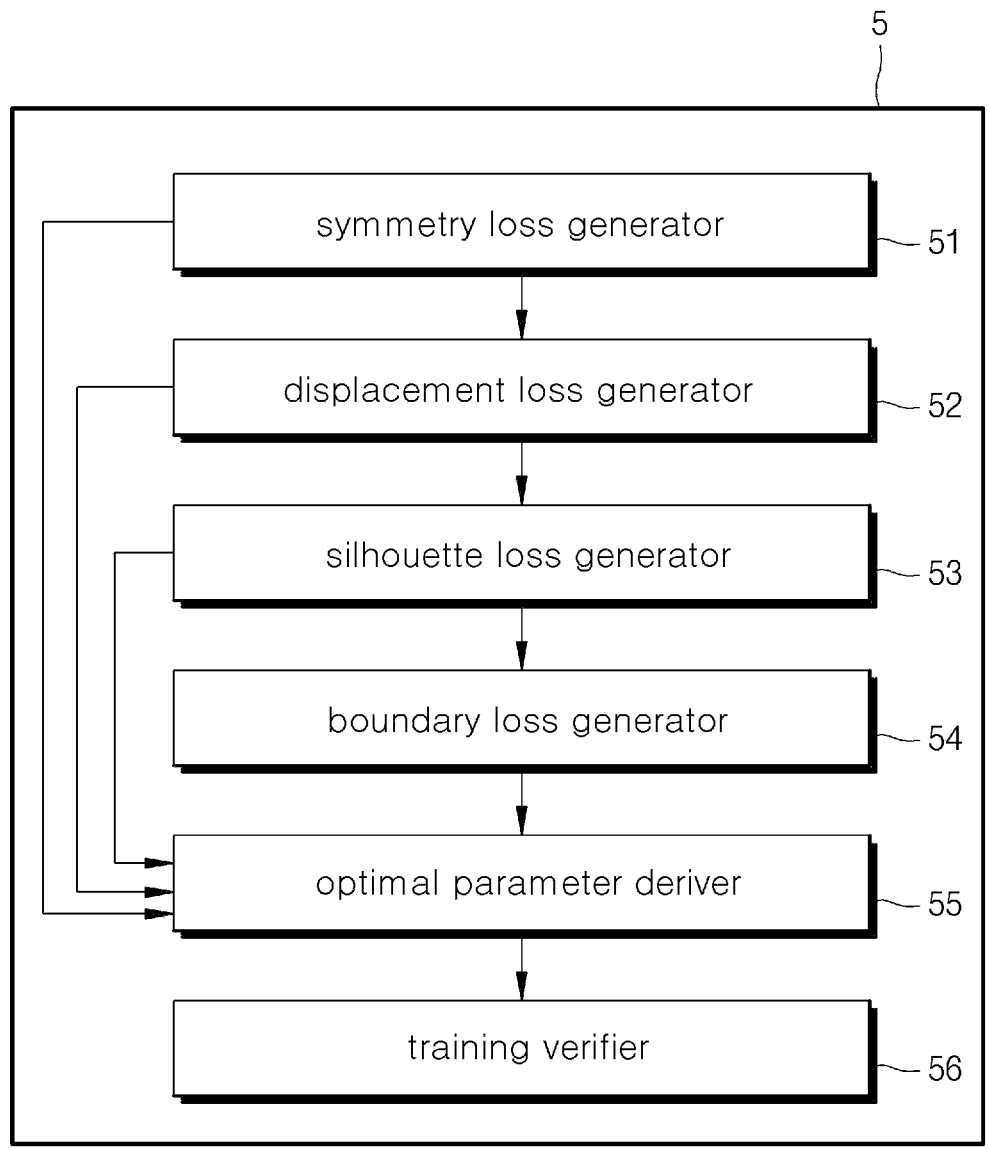
FIG. 5 is a diagram illustrating a detailed configuration of a postprocessing device of FIG. 1.
Figure 6:
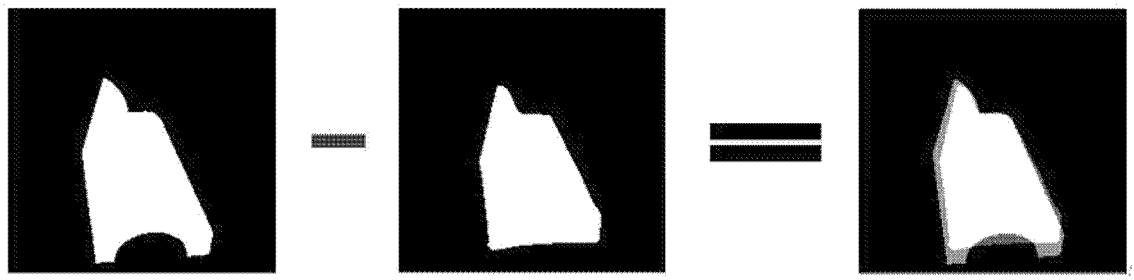
FIG. 6 is a diagram illustrating the concept of silhouette loss of FIG. 5.
Figure 7:
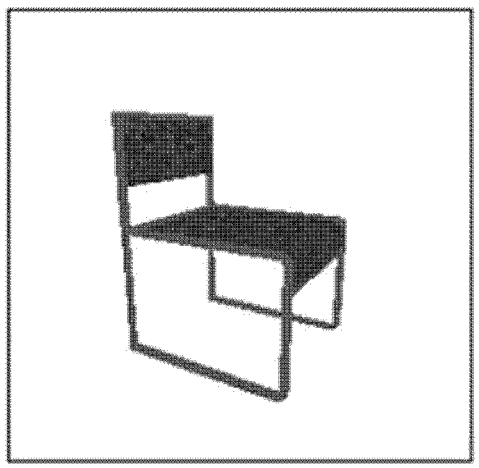
FIG. 7 is a diagram illustrating a reconstructed 3D model image caused by the silhouette error of FIG. 6.
Figure 7:
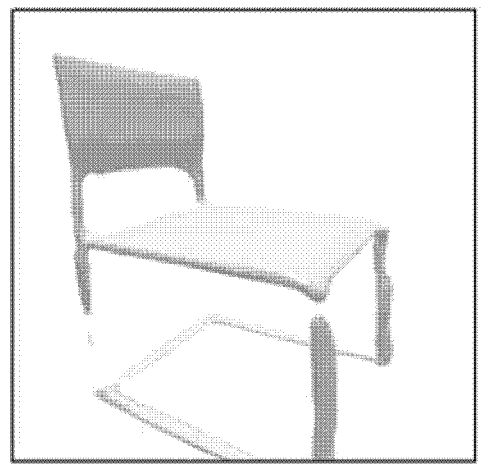
Figure 8:
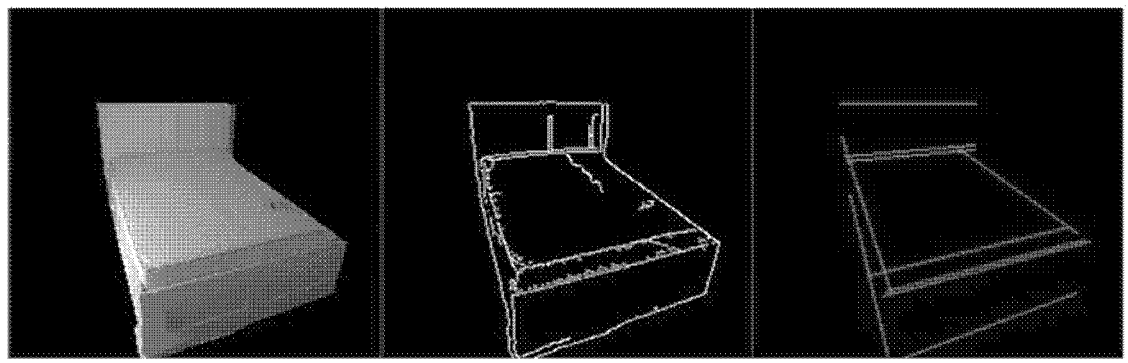
FIG. 8 is a diagram illustrating edge and line images of boundary loss of FIG. 5.

FIG. 1 is a diagram illustrating a configuration of a system for generating a high-resolution 3D model according to an embodiment. FIG. 2 is a diagram illustrating examples of output images of each device of FIG. 1. FIG. 3 is a diagram illustrating a detailed configuration of a view point generation device of FIG. 1. FIG. 4 is a diagram illustrating an output image of a view point generation device of FIG. 3. FIG. 5 is a diagram illustrating a detailed configuration of a postprocessing device of FIG. 1. FIG. 6 is a diagram illustrating the concept of silhouette loss of FIG. 5. FIG. 7 is a diagram illustrating a reconstructed 3D model image caused by silhouette error of FIG. 6. FIG. 8 is a diagram illustrating edge and line images of boundary loss of FIG. 5.

Referring to FIGS. 1 to 8, a system for generating a high-resolution 3D model according to an embodiment derives loss between an original image, a reconstructed 3D model image, and a 3D refined image, and generates an optimal parameter for minimizing the loss, and provides the optimal parameter to a training device. The system may include an image reconstruction device 1, the training device 2, a refinement device 3, a view point generation device 4, and a postprocessing device 5.

The image reconstruction device 1 performs reconstruction on an obtained original image with a predetermined mesh system to output a 3D model image, and transmits the output 3D model image to the training device 2.

The training device 2 performs training based on a neural network by using the original image and the reconstructed 3D model image as inputs, and outputs symmetry reliability degrees VsConf, vertex coordinate information εoffset, and movement control coefficients VDeform of the reconstructed 3D model image.

Herein, the structure of the neural network of the training device 2 may be provided with a residual network (ResNet), perceptual feature pooling, a graph convolutional network, and fully connected layers (FC Layers). The structure of the neural network is not specifically described, but can be understood by those skilled in the art.

The vertex coordinates εoffset of the reconstructed 3D model image is provided to the refinement device 3.

The refinement device 3 refines the reconstructed 3D model image by applying the vertex coordinates εoffset of the reconstructed 3D model image to derive a 3D refined image, and provides the derived 3D refined image to the postprocessing device 5.

In the meantime, the view point generation device 4 receiving an original image derives a view point, which is a photographing location of the original image. Referring to FIG. 3, the view point generation device 4 may include a view point estimator 41, a view point deriver 42, and a view point converter 43.

The view point estimator 41 estimates the view point through training based on the neural network by using the received original image as an input, and transmits the estimated view point to the view point deriver 42.

In an embodiment, a process of estimating a view point through training based on a neural network is to estimate the view point of an original image by using a few-shot-based view point estimator. In this specification, the few-shot-based view point estimator is not specifically described, but can be understood by those skilled in the art.

Referring to FIG. 4, the estimated view point derived using the few-shot-based view point estimator includes an azimuth, an elevation, and a rotation, and the estimated information ($\widehat{azim}, \widehat{elev}, \widehat{inl}$) is transmitted to the view point deriver 42.

The view point deriver 42 derives view point information x, y, z that is optimized to minimize a difference between location information of a camera and the estimated view point information.

That is, view point deriver 42 performs training based on the neural network for the received view point estimation information ($\widehat{azim}, \widehat{elev}, \widehat{inl}$), uses binary cross-entropy (BCE) for a training result to derive the loss between the location of the camera and the estimated view point, and derives an optimal view point for minimizing the derived loss in an orthogonal coordinate system.

In the meantime, the view point converter 43 converts the view point information (x, y, z) of the orthogonal coordinate system to view point information (azim,elev,dist) of a spherical coordinate system by using the equation below.

$$azim = \arctan\left(\frac{x}{z}\right) \quad \text{if } x \geq 0 \quad \text{[Equation 21]}$$
$$azim = \arctan\left(\frac{x}{z}\right) + \pi \quad \text{if } x < 0$$
$$elev = \arctan\left(\frac{y}{\sqrt{x^2+z^2}}\right)$$

The postprocessing device 5 derives at least one loss function by using the reconstructed 3D model image, the symmetry reliability degrees VsConf, the vertex coordinate information εoffset, the movement control coefficients VDeform of the training device 2, and the 3D refined image as inputs, and generates an optimal parameter for minimizing the derived loss function, and provides the generated parameter to the training device 2. Referring to FIG. 5, the postprocessing device 5 may include a symmetry loss generator 51, a displacement loss generator 52, a silhouette loss generator 53, and a boundary loss generator 54.

The symmetry loss generator 51 generates symmetry loss that includes image symmetry loss and vertex symmetry loss between the 3D refined image and a symmetry image symmetrical to the 3D refined image with the symmetry reliability degrees of the training device.

The vertex symmetry loss is defined as vertex loss between the 3D refined image and the symmetry image symmetrical to the 3D refined image with respect to a central axis determined on the basis of the symmetry reliability degrees $V_{sConf}$ of the training device 2, and the defined vertex symmetry loss function may satisfy Equation 1.

[Equation 1]

Vertex symmetry loss =

$$\frac{1}{N}\sum_{i=1}^{N}\sigma_i \min \|Tv_i - v_j\|_2^2 + \lambda_{SymB}\ln\left(\frac{1}{\sigma_i}\right)$$

Herein, $\sigma_i \in V_{sConf}$, $v_i$ denote the vertexes of the 3D refined image, T denotes a symmetry operator, and $\lambda_{SymB}$ denotes a hyperparameter determined as a training result.

In the meantime, the image symmetry loss is defined as an image pair $\{(M_r^{p1}, M_r^{Tp1}), \ldots, (M_r^{pm}, M_r^{Tpm})\}$ between the 3D model image rendered with multiple view points $P_{Isym} = \{p_1, \ldots, p_m\}$ and the original image, and the defined image symmetry loss can be expressed by Equation 2.

[Equation 2]

Image symmetry loss =

$$\frac{1}{m}\sum_{i=1}^{m}\sum_{j,k}\left[\sigma_{j,k}\left\|\gamma(h(M_r^{p1}))_{j,k} - \gamma(M_r^{Tp1})_{j,k}\right\|_2^2 + \lambda_{SymB}\ln\left(\frac{1}{\sigma_{j,k}}\right)\right]$$

$h(\cdot)$ denotes a vertical image flip, j,k denote image coordinates, $\sigma_{j,k}$ denote symmetry reliability degrees in the image coordinates, and $\gamma(\cdot)$ denotes a silhouette.

In the meantime, the displacement loss generator 52 generates displacement loss between vertexes of the 3D refined image and vertexes of the 3D model image on the basis of vertex coordinates, which are derived by the training device, to be moved, and the movement control coefficients of remaining vertexes excluding vertexes to be moved, and the vertex coordinate information of the training device.

The displacement loss is defined as a mean squared error (MSE) that is derived on the basis of the vertex coordinate information εoffset of the training device to be moved among multiple vertexes, and the movement control coefficients $V_{Deform}$ of the remaining vertexes excluding the vertexes to be moved, and the defined displacement loss function may satisfy Equations 3 and 4.

[Equation 3]

$$\text{Huber loss} = \begin{cases} \sum_{i=1}^{N} 0.5 * (y_i - \hat{y}_i)^2 & \text{if } |y_i - \hat{y}_i| < \delta \\ \sum_{i=1}^{N} \delta * (|y_i - \hat{y}_i| - 0.5 * \delta) \end{cases}$$

[Equation 4]

Displacement loss =

$$\begin{cases} \text{Huber loss} - \sum_{j=1}^{M} 0.5 * (y_j - \hat{y}_j)^2 & \text{if } |y_j - \hat{y}_j| < \delta \\ \text{Huber loss} - \sum_{j=1}^{M} \delta * (|y_j - \hat{y}_j| - 0.5 * \delta) \end{cases}$$

Herein, N denotes the number of vertexes, $y_i$ denote vertex coordinates of the reconstructed 3D model image, $\hat{y}_i$ denote vertex coordinates of a 3D refinement model, M denotes the number of vertexes of the 3D model image to be moved, $y_j$ denote vertex coordinates of the 3D model image to be moved, and $\hat{y}_j$ denote moved vertex coordinates of the 3D refined image.

In the meantime, the silhouette loss generator 53 generates silhouette loss through silhouette comparison between the original image and the 3D model image resulting from conversion into the derived view point of the spherical coordinate system.

For example, referring to FIG. 6, the silhouette loss (shown in FIG. 6 (c)) may be derived on the basis of the difference between the 3D refined image (shown in FIG. 6 (a)) for the original image and the 3D refined image (shown in FIG. 6 (b)) reconstructed after rendering with the view point with respect to the original image.

It is found that this silhouette loss reduces the quality of the reconstructed 3D model image shown in FIG. 7 (b) compared to the original image shown in FIG. 7 (a).

The silhouette loss function may be defined as the sum of a partial silhouette loss function and loss function binary cross-entropy (BCE) for silhouette for coordinates $y_i$ of vertexes of the 3D model image rendered with the view point and coordinates $\hat{y}_i$ of vertexes of the original image, and the silhouette loss function may satisfy Equation 5.

[Equation 5]

silhouette loss =

$$-(y_i \log(p_i) + (1 - y_i)\log(1 - p_i)) + \log\frac{|S_{image} - S_{refine}|}{|S_{image} - S_{original}|}$$

Herein, $S_{image}$ denotes the original image, $S_{refin}$ denotes the 3D refined image, and $S_{original}$ denotes the 3D model image, $y_i$ denote binary indicators (0,1), and p denotes probability distribution.

In the meantime, the boundary loss generator 54 generates edge loss and line loss between the original image and the 3D refined image. For example, the boundary loss generator 54 uses an edge detector and a line detector to generate edge and line errors of the 3D refined image and the reconstructed 3D model image.

The postprocessing device 5 further includes an optimal parameter deriver 55. The optimal parameter deriver 55 generates an optimal parameter for minimizing the symmetry loss, displacement loss, silhouette loss, and boundary loss on the basis of the solutions of the symmetry loss, displacement loss, silhouette loss, and boundary loss functions, and transmits the generated optimal parameter to the training device 3. The training device 3 performs training with the received optimal parameter.

In the meantime, the postprocessing device 5 further includes a training verifier 56 that verifies the performance of the training device 3 by using F-score and Chamfer L2 distance. In the training verifier 56, a training performance evaluation reference is at least one selected from a group of precision, recall, accuracy F score, and Chamfer L2 distance, and the F score and the Chamfer L2 distance may be derived from Equations 6 and 7, respectively. Herein, the F-score and the chamfer L2 distance were used to determine the performance of the trained network.

The F-score is a harmonic mean of the precision and the recall. The precision is the proportion of samples that were actually correct answers out of those determined as correct answers. The recall is the proportion of samples that were well determined as correct answers out of those should have been determined as correct answers.

In addition, the chamfer L2 distance is a distance by which each point is away from a correct answer, and determines the performance of an algorithm.

$$F - \text{Score} = \frac{1}{\frac{1}{2}\left(\frac{1}{\text{recall}} + \frac{1}{\text{precision}}\right)} \quad \text{[Equation 6]}$$

$$\text{Chamfer } L2 \text{ Distance} = \sqrt{d_1^2 + d_2^2 + d_3^2 + \ldots} \quad \text{[Equation 7]}$$

The training verifier 56 may determine that the quality of 3D refined image is improved as shown in Tables 1 and 2 that show a training result based on an optimal parameter for minimizing the symmetry loss, displacement loss, silhouette loss, and boundary loss.

TABLE 1

| Existing model | | Proposed model | |
|---|---|---|---|
| F-score | Chamfer-L2 Distance | F-score | Chamfer-L2 Distance |
| 0.3061 | 182.1502 | 0.4915 | 104.3137 |

TABLE 2

| | Existing model | | Proposed model | |
|---|---|---|---|---|
| | F-score | Chamfer-L2 Distance | F-score | Chamfer-L2 Distance |
| airplane | −0.116 | −23.479 | 0.016 | −6.655 |
| bench | −0.103 | −1951.209 | 0.022 | −1937.418 |
| cabinet | −0.127 | 57.182 | 0.002 | −2.624 |
| car | −0.339 | 45.214 | 0.000 | −0.030 |
| chair | −0.233 | 92.172 | 0.009 | −7.572 |
| display | −0.031 | 51.586 | 0.007 | −5.400 |
| lamp | −0.057 | −854.180 | 0.024 | −1120.884 |
| speaker | −0.219 | 91.340 | 0.003 | −0.397 |
| rifle | −0.507 | 87.942 | −0.018 | 0.561 |
| sofa | −0.113 | 71.114 | 0.007 | −1.277 |
| table | −0.177 | 193.113 | 0.025 | −0.492 |
| telephone | −0.069 | 26.483 | 0.027 | −0.674 |
| vessel | −0.177 | 40.722 | 0.018 | −1.014 |

Herein, referring to Tables 1 and 2, the higher the F-score and the shorter the chamfer L2 distance, the higher the resolution of a 3D image (shown in bold). Accordingly, it is found that the quality of a 3D image can be improved as the postprocessing device 5 according to an embodiment compensates for symmetry loss, displacement loss, silhouette loss, and boundary loss.

According to another aspect of the present disclosure, there is provided a method for generating a high-resolution 3D model, the method including steps of: performing reconstruction on one original image to generate a 3D model image; performing training based on a neural network by using the original image and the 3D model image as inputs, to derive symmetry reliability degrees, vertex coordinate information, and movement control coefficients; refining the 3D model image on the basis of the vertex coordinate information to derive a 3D refined image; generating a view point that is location coordinates of a camera, by using the original image as an input; and postprocessing of deriving at least one loss function on the basis of the original image, the view point, the 3D model image, and the 3D refined image, and generating an optimal parameter for minimizing the derived loss function, and training the neural network of a training device with the generated optimal parameter.

In addition, the step of view point generating may include: performing training based on the neural network with respect to the original image, and estimating the view point that is a photographing location of the original image with a plurality of cameras; performing training based on the neural network with respect to the estimated view point, and then deriving loss between a location of the camera and the estimated view point by using binary cross-entropy (BCE) for a training result, and deriving an optimal view point for minimizing the derived loss; and converting the optimal view point of an orthogonal coordinate system into a spherical coordinate system.

Herein, the loss function may include at least one of the following: symmetry loss including image symmetry loss and vertex symmetry loss between the 3D refined image and a symmetry image symmetrical to the 3D refined image with the symmetry reliability degrees of the training device; displacement loss between vertexes of the 3D model image and vertexes of the 3D refined image refined on the basis of the vertex coordinate information of the training device; silhouette loss through silhouette comparison between the original image and the 3D model image resulting from conversion to the generated view point of a spherical coordinate system; and edge loss and line loss between the original image and the 3D refined image.

Each step for generating a high-resolution 3D image is a function performed by the image reconstruction device 1, the training device 2, the refinement device 3, the view point generation device 4, and the postprocessing device 5 described above, and detailed references will be omitted.

For convenience of understanding, a description in which one processor is used is given, but those skilled in the art will understand that a processing device may include a plurality of processing elements and/or a plurality of types of processing elements. For example, a control part may include a plurality of processors or one processor and one controller. In addition, other processing configurations, such as a parallel processor, are possible.

Herein, software may include a computer program, code, an instruction, or any combination thereof, and may configure the processing device so as to operate as desired, or may instruct the processing device independently or collectively.

The software and/or information, signal, and data may be permanently or temporarily embodied in any type of machine, component, physical device, virtual equipment, computer storage medium or device, or a transmitted signal wave, in order to be interpreted by the control part or to provide an instruction or data to the processing device.

The software may also be distributed over network-coupled computer systems so that the software may be stored or executed in a distributed manner. The software and data may be stored in one or more computer-readable recording media.

A method according to an embodiment may be embodied as program instructions executable by various computer means and may be recorded on a computer-readable recording medium. The computer-readable recording medium may include program instructions, data files, data structures, and the like separately or in combinations. The program instructions to be recorded on the computer-readable recording medium may be specially designed and configured for embodiments of the present disclosure or may be well-known to and be usable by those skilled in the art of computer software.

Examples of the computer-readable recording medium include magnetic recording media such as hard disks, floppy disks, and magnetic tapes; optical data storage media such as CD-ROMs, and DVD-ROMs; magneto-optical media such as floptical disks; and hardware devices, such as read-only memory (ROM), random-access memory (RAM), and flash memory, which are particularly structured to store and implement the program instructions.

Examples of the program instructions include not only a mechanical language code formatted by a compiler but also a high level language code that may be implemented by a computer using an interpreter, and the like.

The hardware devices may be configured to be operated by one or more software modules or vice versa to conduct the operation according to an embodiment.

As described above, although the present disclosure has been described with limited embodiments and the drawings, those skilled in the art will appreciate that the present disclosure can be embodied in many alternate forms. For example, suitable results may be achieved if the described techniques are performed in a different order and/or if components in a described system, architecture, device, or circuit are combined in a different manner and/or replaced or supplemented by other components or their equivalents.

Therefore, the scope of the present disclosure shall not be limited to the above-described embodiments, and should be determined by the appended claims as well as equivalents thereto.

What is claimed is:

1. A system for generating a high-resolution 3D model, the system comprising:
    an image reconstruction device for performing reconstruction on one original image to generate a 3D model image;
    a training device for performing training based on a neural network by using the original image and the 3D model image as inputs, to derive symmetry reliability degrees, vertex coordinate information, and movement control coefficients;
    a refinement device for refining the 3D model image on the basis of the vertex coordinate information to derive a 3D refined image;
    a view point generation device for generating a view point that is location coordinates of a camera, by using the original image as an input; and
    a postprocessing device for deriving at least one loss function on the basis of the original image, the view point, the 3D model image, and the 3D refined image, and generating an optimal parameter for minimizing the derived loss function, and training the neural network of the training device with the generated optimal parameter,
    wherein the postprocessing device comprises at least one of the following:
    a symmetry loss generator for generating image symmetry loss and vertex symmetry loss between the 3D refined image and a symmetry image symmetrical to the 3D refined image with the symmetry reliability degrees of the training device;
    a displacement loss generator for generating displacement loss between vertexes of the 3D refined image and a vertex of the 3D model image on the basis of vertex coordinates to be moved and derived by the training device, the movement control coefficients of the remaining vertexes excluding the vertexes to be moved, and the vertex coordinate information of the training device;
    a silhouette loss generator for generating silhouette loss through silhouette comparison between the original image and the 3D model image resulting from conversion to the generated view point of a spherical coordinate system; and
    a boundary loss generator for generating edge loss and line loss between the original image and the 3D refined image, and
    wherein the vertex symmetry loss function is defined as vertex loss between the 3D refined image and the symmetry image symmetrical to the 3D refined image with respect to a central axis determined on the basis of the symmetry reliability degrees $V_{sConf}$ of the training device, and the defined vertex symmetry loss function satisfies Equation 1, $$\text{Vertex symmetry loss} = \frac{1}{N}\sum_{i=1}^{N}\sigma_i \min \|Tv_i - v_j\|_2^2 + \lambda_{SymB}\ln\left(\frac{1}{\sigma_i}\right) \quad [\text{Equation 1}]$$

herein, N denotes number of the vertexes, $\sigma_i$ denoted the movement control coefficients determined such that, $\sigma_i \in V_{sConf}$, $v_i$ denote the vertex of the 3D refined image, $v_j$ denotes the vertexes of the 3 D model image, T denotes a symmetry operator, $\|T_{v_i} - v_j\|_2^2$ denoted the second norm, and $\lambda_{SymB}$ denotes a hyperparameter determined as a training result.

2. The system of claim 1, wherein the view point generation device comprises:
    a view point estimator for performing training based on the neural network with respect to the original image, and estimating the view point that is a photographing location of the original image with a plurality of cameras;
    a view point deriver for performing training based on the neural network with respect to the estimated view point, and then deriving loss between a location of the camera and the estimated view point by using binary cross-entropy (BCE) for a training result, and deriving an optimal view point for minimizing the derived loss; and
    a view point converter for converting the optimal view point of an orthogonal coordinate system into a spherical coordinate system.

3. The system of claim 1, wherein the image symmetry loss function is defined as an image pair $\{(M_r^{p1}, M_r^{Tp1}), \ldots, (M_r^{pm}, M_r^{Tpm})\}$ between the 3D model image rendered with a plurality of view points $P_{Isym} = \{p_1, \ldots, p_m\}$ and the original image, and the defined image symmetry loss function satisfies Equation 2, $$\text{Image symmetry loss} = \frac{1}{m}\sum_{i=1}^{m}\sum_{j,k}\left[\sigma_{j,k}\left\|\gamma\bigl(h(M_r^{p1})\bigr)_{j,k} - \gamma(M_r^{Tp1})_{j,k}\right\|_2^2 + \lambda_{SymB}\ln\left(\frac{1}{\sigma_{j,k}}\right)\right] \quad [\text{Equation 2}]$$

herein, m denotes number of viewpoints with cameras, $h(\cdot)$ denotes a vertical image flip, j,k denote image coordinates, $\sigma_{j,k}$ denotes the symmetry reliability degrees in the image coordinates, and $\gamma(\cdot)$ denotes a silhouette.

4. The system of claim 1, wherein the displacement loss function is defined as a mean squared error (MSE) that is derived on the basis of the vertex coordinate information $\varepsilon_{offset}$ of the training device to be moved among the multiple vertexes, and the movement control coefficients $V_{Deform}$ of the remaining vertexes excluding the vertexes to be moved, and the defined displacement loss function satisfies Equations 3 and 4, $$\text{Huber loss} = \begin{cases} \sum_{i=1}^{N} 0.5*(y_i - \hat{y}_i)^2 & \text{if } |y_i - \hat{y}_i| < \delta \\ \sum_{i=1}^{N} \delta*(|y_i - \hat{y}_i| - 0.5*\delta) \end{cases} \quad [\text{Equation 3}]$$

Displacement loss =

$$\begin{cases} \text{Huber loss} - \sum_{j=1}^{M} 0.5*(y_j - \hat{y}_j)^2 & \text{if } |y_j - \hat{y}_j| < \delta \\ \text{Huber loss} - \sum_{j=1}^{M} \delta*(|y_j - \hat{y}_j| - 0.5*\delta) \end{cases} \quad [\text{Equation 4}]$$

herein, N denotes the number of the vertexes, $y_i$ denote vertex coordinates of the 3D model image resulting from reconstruction, $\hat{y}_i$ denote vertex coordinates of a 3D refinement model, $\delta$ denotes a threshold parameter, M denotes the number of the vertexes of the 3D model image to be moved, $y_j$ denote vertex coordinates of the 3D model image to be moved, and $\hat{y}_j$ denote moved vertex coordinates of the 3D refined image.

5. The system of claim 1, wherein the silhouette loss function is defined as a sum of a partial silhouette loss function and loss function binary cross-entropy (BCE) for silhouette for coordinates $y_i$ of the vertexes of the 3D model image resulting from conversion to the view point and coordinates $\hat{y}_i$ of vertexes of the original image, and the silhouette loss function satisfies Equation 5, silhouette loss =

$$-(y_i \log(p_i) + (1 - y_i)\log(1 - p_i)) + \log\frac{|S_{image} - S_{refine}|}{|S_{image} - S_{original}|} \quad [\text{Equation 5}]$$

herein, $S_{image}$ denotes the original image, $S_{refin}$ denotes the 3D refined image, and $S_{original}$ denotes the 3D model image, and p denotes probability distribution.

6. A method for generating a high-resolution 3D model, the method being performed by a system for generating the high-resolution 3D model according to claim 1 and the method comprising steps of:
performing reconstruction on one original image to generate a 3D model image;
performing training based on a neural network by using the original image and the 3D model image as inputs, to derive symmetry reliability degrees, vertex coordinate information, and movement control coefficients;
refining the 3D model image on the basis of the vertex coordinate information to derive a 3D refined image;
generating a view point that is location coordinates of a camera, by using the original image as an input; and
postprocessing of deriving at least one loss function on the basis of the original image, the view point, the 3D model image, and the 3D refined image, and generating an optimal parameter for minimizing the derived loss function, and training the neural network of a training device with the generated optimal parameter, wherein the loss function comprises at least one of the following:
symmetry loss including image symmetry loss and vertex symmetry loss between the 3D refined image and a symmetry image symmetrical to the 3D refined image with the symmetry reliability degrees of the training device;
displacement loss between a vertex of the 3D model image and vertexes of the 3D refined image refined on the basis of the vertex coordinate information of the training device;
silhouette loss through silhouette comparison between the original image and the 3D model image resulting from conversion to the generated view point of a spherical coordinate system; and
edge loss and line loss between the original image and the 3D refined image, and
wherein the vertex symmetry loss function is defined as vertex loss between the 3D refined image and the symmetry image symmetrical to the 3D refined image with respect to a central axis determined on the basis of the symmetry reliability degrees $V_{sConf}$ of the training device, and the defined vertex symmetry loss function satisfies Equation 11, Vertex symmetry loss =

$$\frac{1}{N}\sum_{i=1}^{N}\sigma_i \min\|T_{v_i} - v_j\|_2^2 + \lambda_{SymB}\ln\left(\frac{1}{\sigma_i}\right) \quad [\text{Equation 11}]$$

herein, N denotes number of the vertexes, $\sigma_i$ denotes the movement control coefficients determined such that, $\sigma_i \in v_{sConf}$, $v_i$ denote the vertex of the 3D refined image, $v_j$ denote the vertexes of the 3D model image, T denotes a symmetry operator, $\mu T_{v_i} - v_j \mu_2^2$ denotes the second norm, and $\lambda_{SymB}$ denotes a hyperparameter determined as a training result.

7. The method of claim 6, wherein the step of view point generating comprises:
performing training based on the neural network with respect to the original image, and estimating the view point that is a photographing location of the original image with a plurality of cameras;
performing training based on the neural network with respect to the estimated view point, and then deriving loss between a location of the camera and the estimated view point by using binary cross-entropy (BCE) for a training result, and deriving an optimal view point for minimizing the derived loss; and
converting the optimal view point of an orthogonal coordinate system into a spherical coordinate system.

8. The method of claim 6, wherein the image symmetry loss function is defined as an image pair $\{(M_r^{p1}, M_r^{Tp1}), \ldots, (M_r^{pm}, M_r^{Tpm})\}$ between the 3D model image rendered with a plurality of view points $P_{Isym}=\{p_1, \ldots, p_m\}$ and the original image, and the defined image symmetry loss function satisfies Equation 12, Image symmetry loss = $\frac{1}{m}$ [Equation 12]

$$\sum_{i=1}^{m}\sum_{j,k}\left[\sigma_{j,k}\|\gamma(h(M_r^{p1}))_{j,k} - \gamma(M_r^{Tp1})_{j,k}\|_2^2 + \lambda_{SymB}\ln\left(\frac{1}{\sigma_{j,k}}\right)\right]$$

herein, m denotes number of viewpoints with cameras, h(•) denotes a vertical image flip, j,k denote image coordinates, $\sigma_{j,k}$ denote the symmetry reliability degrees in the image coordinates, and $\gamma(\cdot)$ denotes a silhouette.

9. The method of claim 6, wherein the displacement loss function is defined as a mean squared error (MSE) that is derived on the basis of vertex coordinates of the 3D refined image refined with the vertex coordinate information $\varepsilon_{offset}$ of the training device to be moved among the multiple vertexes and the movement control coefficients $V_{Deform}$ of the remaining vertexes excluding the vertexes to be moved, and the defined displacement loss function satisfies Equations 13 and 14, $$\text{Huber loss} = \begin{cases} \sum_{i=1}^{N} 0.5 * (y_i - \hat{y}_i)^2 & \text{if } |y_i - \hat{y}_i| < \delta \\ \sum_{i=1}^{N} \delta * (|y_i - \hat{y}_i| - 0.5 * \delta) \end{cases}$$

[Equation 13]

Displacement loss =

$$\begin{cases} \text{Huber loss} - \sum_{j=1}^{M} 0.5 * (y_j - \hat{y}_j)^2 & \text{if } |y_j - \hat{y}_j| < \delta \\ \text{Huber loss} - \sum_{j=1}^{M} \delta * (|y_j - \hat{y}_j| - 0.5 * \delta) \end{cases}$$

[Equation 14]

herein, N denotes the number of the vertexes, $y_i$ denote vertex coordinates of the 3D model image resulting from reconstruction, $\hat{y}_i$ denote vertex coordinates of a 3D refinement model, $\delta$ denotes a threshold parameter, M denotes the number of the vertexes of the 3D model image to be moved, $y_j$ denote vertex coordinates of the 3D model image to be moved, and $\hat{y}_j$ denote moved vertex coordinates of the 3D refined image.

10. The method of claim 6, wherein the silhouette loss function is defined as a sum of a partial silhouette loss function and loss function binary cross-entropy (BCE) for silhouette for coordinates $y_i$ of the vertexes of the 3D model image resulting from conversion to the view point and coordinates $\hat{y}_i$ of vertexes of the original image, and the silhouette loss function satisfies Equation 15, silhouette loss =

$$-(y_i \log(p_i) + (1 - y_i)\log(1 - p_i)) + \log \frac{|S_{image} - S_{refine}|}{|S_{image} - S_{original}|}$$

[Equation 15]

herein, $S_{image}$ denotes the original image, $S_{refin}$ denotes the 3D refined image, and $S_{original}$ denotes the 3D model image, and p denotes probability distribution.

* * * * *